Oct. 25, 1966    KAZUYOSI OZAKI    3,281,632
DYNAMIC BRAKING APPARATUS FOR INDUCTION MOTOR
Filed Aug. 1, 1963    2 Sheets-Sheet 1

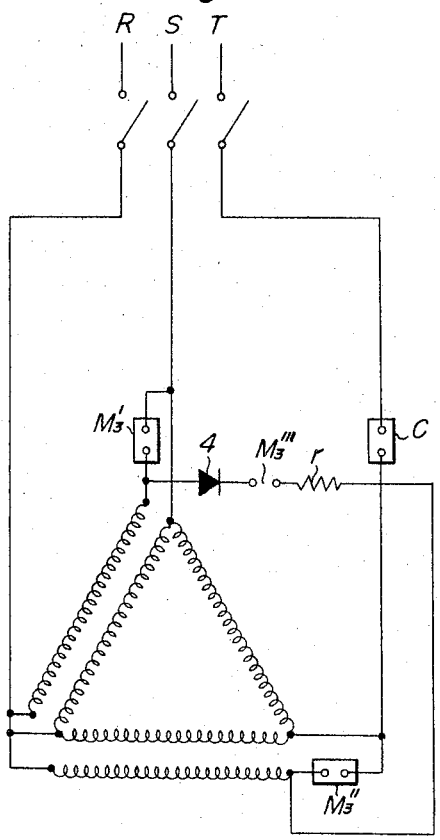
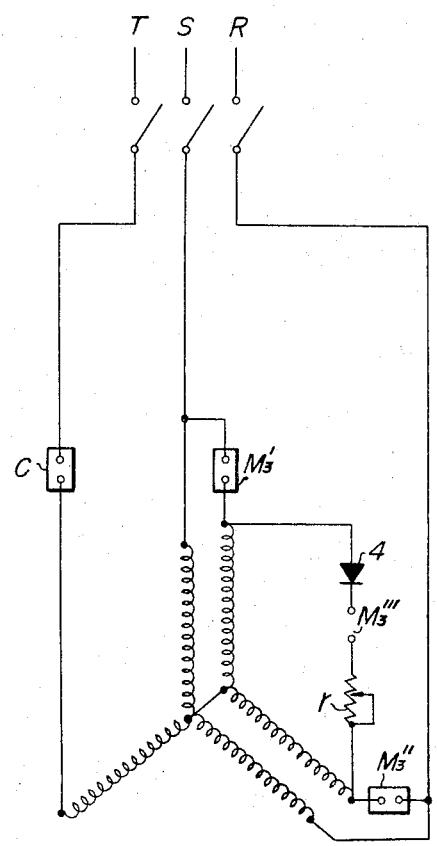

United States Patent Office 3,281,632
Patented Oct. 25, 1966

3,281,632
DYNAMIC BRAKING APPARATUS FOR
INDUCTION MOTOR
Kazuyosi Ozaki, 56 Oaza Katayama, Suita-shi, Japan
Filed Aug. 1, 1963, Ser. No. 299,275
Claims priority, application Japan, Apr. 8, 1963,
38/18,706
1 Claim. (Cl. 318—211)

The present invention relates to dynamic braking apparatus for induction motors.

An object of the present invention is to provide an improved dynamic braking apparatus for induction motors. According to the invention, there is provided a pair of stator windings of an equal number of turns and disposed in the same slots, said windings being connected in parallel for a normal operation, one of said stator windings being disconnected from its alternating current source for braking operation, the current induced therein by the excitation effect of the other stator winding being converted into direct current by a rectifier and a resistance, whereby a dynamic braking force is developed.

Other objects and advantages of the present invention will become apparent from the following detailed description with reference to the accompanying drawings, in which:

FIGS. 3 and 4 are, respectively, schematic diagrams of other embodiments according to the present invention.

Figure 1:
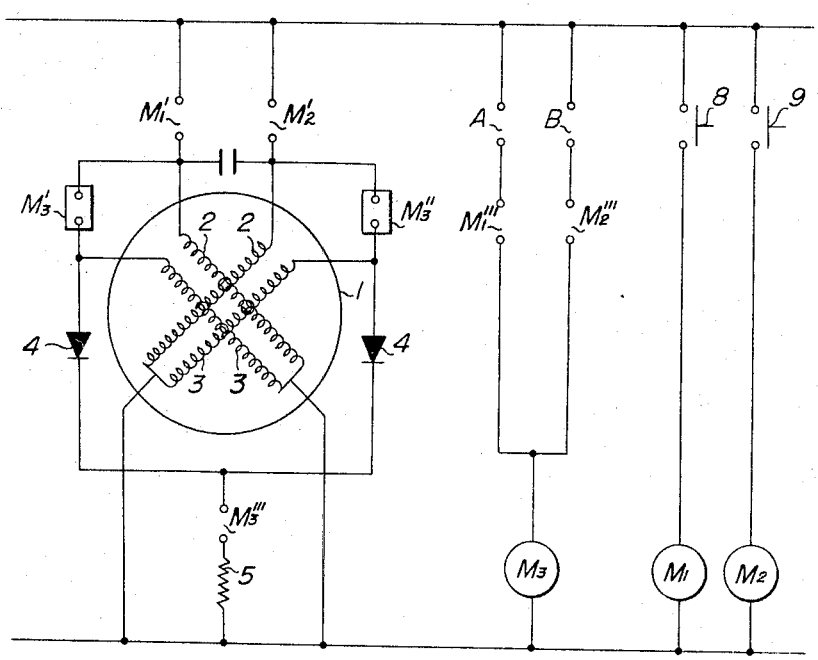
FIG. 1 is a schematic diagram of an electric circuit of a dynamic braking apparatus according to a preferred embodiment of the present invention for an induction motor.
Figure 2:
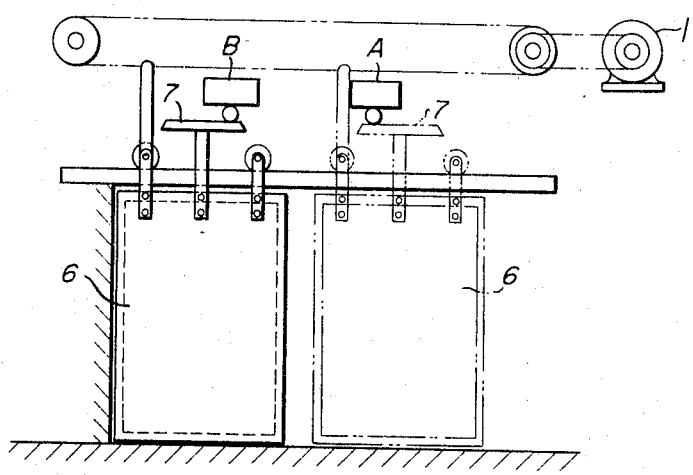
FIG. 2 is a side view of an automatic apparatus for opening and closing doors, said apparatus employing the circuit shown in FIG. 1.

As shown in FIG. 1, the stator of a single phase induction motor 1 includes a pair of windings 2 and 3. These windings have an equal number of turns and are disposed in the same slots. During normal operation of the motor 1, the pair of stator windings 2 and 3 are connected in parallel but, for a braking operation of the motor, one of the stator windings 3 is disconnected from the alternating current source. The current induced therein by the excitation effect of the other stator winding 2 is converted into direct current by a rectifier 4 and a resistance 5. This direct current performs the dynamic braking action. A case wherein the present invention is applied to an automatic apparatus for operating a door will now be described with supplemental reference to FIG. 2 of the accompanying drawings.

When a push button switch 8 is pressed, a current passes through a magnetic switch $M_1$ for opening the door, and as contacts $M'_1$ and $M'_2$ are closed, the pair of stator windings 2 and 3 of a motor 1 are equally excited, and the motor rotates at its rated speed, and door 6 opens at its full speed. When a track plate 7 reaches a micro-switch A installed at the upper edge of the door 6, the switch A is operated by the track plate 7, and the magnetic switch $M_3$ is excited by current flowing through contact $M'''_1$. Thereby, normally closed contacts $M'_3$ and $M''_3$ being opened, the stator winding 3 is cut off from the circuit, and contact $M'''_3$ being closed, the motor 1 is rotated by the other stator winding 2 only.

The stator winding 2 induces, in the separated stator winding 3, a voltage which is converted by a rectifier 4 into a direct current flowing through the rectifier 4, the closed contact $M'''_3$, the resistance 5, and the winding 3. As the reuslt, the motor is dynamically braked. Consequently, in the case when the door is being closed, the inertia of the door is absorbed by the motor as the door approaches its closed position, the operating speed of the door lessens and the door closes slowly. On the other hand, when a press-button switch 9 is pressed for closing the opened door, a current passes through a magentic switch $M_2$, and as contacts $M'_2$ and $M'''_2$ are closed, the pair of stator windings 2 and 3 of the motor 1 are both excited. This time the motor rotates in the reverse direction at its rated speed, because the condenser is coupled with the other winding, and the door closes at its full speed. When the track plate 7 reaches a micro-switch B installed on the upper edge of the door 6, the switch B is operated by the track plate 7 and a magnetic switch $M_3$ is excited by a current flowing through the contact $M'''_2$. Thereby, normally closed contacts $M'_3$ and $M''_3$ being opened, the stator winding 3 is cut off from the circuit and a contact $M'''_3$ is closed, so that the motor is rotated by the other stator winding 2 only. The stator winding 2 induces, in the separated stator winding 3, a voltage which is converted by a rectifier 4 into a direct current flowing through the rectifier 4, the closed contact $M'''_3$, a resistance 5 and the winding 3. As a result, the motor is dynamically braked. Consequently, losing its own inertia just before its operation is finished, the door closes slowly. In addition, the motor 1, producing a torque near its rated torque, closes or opens the door accurately.

FIG. 1 illustrates the application of the present invention to a single phase condensor motor, but the invention can be applied to a 3-phase induction motor. FIGS. 3 and 4 illustrate the application of the invention to two types of 3-phase induction motor.

Heretofore, dynamic braking of a 3-phase induction motor has required a direct current source in addition to the alternating current source, but besides having the disadvantage of the necessity for another electric source, this earlier procedure has the further disadvantage that it has been found difficult to restart the operation of the motor at the required time because the motor has already lost its driving power.

These disadvantages are overcome by the application of the invention to 3-phase motors, according to which a 3-phase motor has one stator winding and, two pairs of stator windings of an equal number of turns and disposed in the same slots, one stator winding of each of the pairs being connected in parallel to the other stator winding of the same pair for normal operation, and for braking operation one stator winding of each of the pairs being disconnected from the alternating current source, the current induced therein by the excitation effect of the remaining winding of the pair being converted into direct current through a rectifier and a resistance, whereby a dynamic braking force is developed. The 3-phase induction motor, producing its rated torque, operates the door similarly to the case already described wherein a single motor is employed. In the case with a 3-phase induction motor, an adequate effect can be obtained by having the first phase and the third phase made as double windings.

The motor shown in FIG. 3 is in the delta connection, and has two pairs of stator windings and one stator winding between R-S phases, between R-T phases, and between S-T phases respectively. One stator winding of each of the pairs between R-S phases and between R-T phases respectively is connected in parallel to the other stator winding of the same pair through normally closed contacts $M'_3$ and $M''_3$ respectively. After a triple pole switch has been turned on for supplying power, the motor rotates at its rated speed. When normally closed contacts $M'_3$ and $M''_3$ are opened and normally opened contact $M'''_3$ is closed for braking the motor in rotation, one stator winding of each of the pairs between R-S phases and between R-T phases respectively is separated from the circuit. The remaining windings supplied with power induce, at the ends of the two separated stator windings now forming part of a series circuit, a voltage which is converted into a direct current flowing through a halfwave rectifier 4, the contact $M'''_3$ and a resistance $r$. As a result, the motor is dynamically braked.

The motor shown in FIG. 4 is in the star connection and has two pairs of stator windings and one stator winding. These five windings are connected at one end to the common neutral point, and one stator winding of each of the pairs between the R and S phase respectively is connected in parallel to the other stator winding of the same pair through normally closed contacts $M'_3$ and $M''_3$. After a triple pole switch has been turned on for supplying power, the motor rotates at its rated speed. When normally closed contacts $M'_3$ and $M''_3$ are opened and normally opened contact $M'''_3$ is closed for braking the motor in rotation, one stator winding of each of the pairs between the R and S phase respectively is separated from the circuit. The remaining windings supplied with power induce, at the ends of the two separated stator windings now forming part of a series circuit, a voltage which is converted into a direct current flowing through a half-wave rectifier 4, the contact $M'''_3$, and a resistance $r$. As a result, the motor is dynamically braked.

If contact C (FIGS. 3 and 4) is open during braking operation, the braking can be performed without driving force.

In the conventional dynamic braking means of an induction motor, wherein only one set of stator windings is provided, the rotational torque of the motor decreases as the braking force increases and it is impossible to drive the door completely to its limit.

In the dynamic braking apparatus of the present invention, however, wherein, as described above, the stator winding comprises a pair of windings disposed in the same slots, one of the windings being disconnected from the motor circuit at the time of braking, the current induced in this separated stator winding 3 by the excitation effect of the other stator winding 2 is converted into direct current and made to flow through the other winding. In consequence, the motor is slowed down and stops the door quietly and accurately without shock.

What is claimed is:

Dynamic braking apparatus for an induction motor operable with a source of A.C. comprising a stator section divided into a pair of windings disposed in the same slots and containing an equal number of turns; said stator windings being connected in parallel to said source of A.C. during normal operation of said motor, means for open circuiting from the source of A.C. one of said stator windings to achieve braking of said motor, and a rectifier and resistance coupled to said one winding such that the current induced in said opened winding by the excitation effect of the other of said stator windings is converted into direct current by means of said rectifier and a resistance.

No references cited.

ORIS L. RADER, *Primary Examiner.*

G. A. FRIEDBERG, *Assistant Examiner.*